United States Patent
Shepherd et al.

(10) Patent No.: US 12,297,372 B2
(45) Date of Patent: May 13, 2025

(54) PROTECTIVE COATINGS

(71) Applicants: Advanced Innergy Ltd., Gloucester (GB); Dow Silicones Corporation, Midland, MI (US)

(72) Inventors: Simon Harry Shepherd, Gloucester (GB); Laura Louise Jordan, Gloucester (GB); Anil Naik, Gloucester (GB); Tatiana Dimitrova, Seneffe (BE); Anne-Marie Van Stiphoudt, Seneffe (BE)

(73) Assignees: ADVANCED INNERGY LTD., Gloucester (GB); DOW SILICONES CORPORATION, Midland, MI (US)

( * ) Notice: Subject to any disclaimer, the term of this patent is extended or adjusted under 35 U.S.C. 154(b) by 1017 days.

(21) Appl. No.: 17/296,625

(22) PCT Filed: Nov. 28, 2019

(86) PCT No.: PCT/GB2019/053364
§ 371 (c)(1),
(2) Date: May 25, 2021

(87) PCT Pub. No.: WO2020/109799
PCT Pub. Date: Jun. 4, 2020

(65) Prior Publication Data
US 2022/0002563 A1    Jan. 6, 2022

(30) Foreign Application Priority Data

Nov. 30, 2018 (GB) ..................... 1819601

(51) Int. Cl.
C09D 7/61 (2018.01)
C09D 5/18 (2006.01)
C09D 7/40 (2018.01)
C09D 183/06 (2006.01)

(52) U.S. Cl.
CPC ............... C09D 5/185 (2013.01); C09D 7/61 (2018.01); C09D 7/69 (2018.01); C09D 183/06 (2013.01)

(58) Field of Classification Search
None
See application file for complete search history.

(56) References Cited

U.S. PATENT DOCUMENTS

2015/0072079 A1*   3/2015   Bourbigot ............ C09D 183/06
                                                                    427/373

FOREIGN PATENT DOCUMENTS

| CN | 104245868 A | 12/2014 |
| WO | 2013150121 A1 | 10/2013 |
| WO | 2015007628 A1 | 1/2015 |
| WO | 2015007629 A1 | 1/2015 |
| WO | 2019060246 A1 | 3/2019 |
| WO | 2020109799 A1 | 6/2020 |

OTHER PUBLICATIONS

The Effect of Mineral Fillers on the Rheological, Mechanical and Thermal Properties o Halogen-Free Flame Retardant Polypropylene/Expandable Graphite Compounds, Mattausch et al., Researchgate, Jan. 2014. (Year: 2014).*
Partial Translation of Bo, et al., "Flame Retardant Synergisms Between Aluminum Diethlyphosphinate and Hyperbranched Derivative of Triazine Group in PBT", In Journal of Functional Materials, vol. 47, No. 9, Sep. 30, 2016, pp. 9079-9084.
Bo, et al., "Flame Retardant Synergisms Between Aluminum Diethlyphosphinate and Hyperbranched Derivative of Triazine Group in PBT", In Journal of Functional Materials, vol. 47, No. 9, Sep. 30, 2016, pp. 9079-9084.
"Second Office Action for Chinese Patent Application No. 2019800893801", Mailed Date: Aug. 5, 2022, 4 pages.
"Office Action for Chinese Patent Application No. 201980089380.1", Mailed Date: Jan. 12, 2023, 15 pages.
"First Office Action for Chinese Patent Application No. 2019800893801", Mailed Date: Feb. 7, 2022, 3 pages.
"International Search Report and Written Opinion for PCT Patent Application No. PCT/GB2019/053364", Mailed Date: Feb. 25, 2020, 13 Pages.

* cited by examiner

Primary Examiner — Peter A Salamon
(74) Attorney, Agent, or Firm — Calfee, Halter & Griswold LLP

(57) ABSTRACT

A mixture curable in the presence of a suitable metallic catalyst to provide an intumescent coating material. The mixture comprises: a siloxane polymer; a cross-linker for cross-linking the siloxane polymer; filler, wherein the filler comprises char reinforcing filler; and an intumescent ingredient. The intumescent ingredient comprises a phosphorus containing compound or a composition comprising a phosphorus containing compound. The mixture comprises 5 to 20% by weight of the phosphorus containing compound or composition comprising a phosphorus containing compound. The intumescent ingredient comprises 10 to 40% by weight expandable graphite.

19 Claims, No Drawings

PROTECTIVE COATINGS

TECHNOLOGICAL FIELD

Examples of the disclosure relate to a mixture curable to provide an intumescent coating material, an intumescent coating material, a method of providing an intumescent coating material, an intumescent coating, a method of protecting a substrate with an intumescent coating, and a protected substrate.

BACKGROUND

It is often required to provide an intumescent coating around substrates and particularly metallic substrates such as pipework, valves, I-beams and other process components, and structural members. Such a coating when subjected to a fire event expands to form a protective char. The protective Char acts as a physical barrier insulating the substrate and therefore delaying the effects of a fire and slowing the rate of temperature increase of the coated substrate. This therefore potentially protects the substrate from failing or delays the occurrence of failure, thereby providing additional time to permit evacuation of personnel and/or fire fighting.

There is a requirement to provide intumescent coatings which have improved properties in regard to delaying the effects of a fire and slowing the rate of temperature increase of the coated substrate.

All proportions referred to in this specification are indicated as % by weight of the total mixture, unless indicated otherwise.

BRIEF SUMMARY

According to various, but not necessarily all, examples of the disclosure there is provided a mixture curable in the presence of a suitable metallic catalyst to provide an intumescent coating material, wherein the mixture comprises:
 a siloxane polymer;
 a cross-linker for cross-linking the siloxane polymer;
 filler, wherein the filler comprises char reinforcing filler; and
 an intumescent ingredient, wherein the intumescent ingredient comprises a phosphorus containing compound or a composition comprising a phosphorus containing compound, wherein the mixture comprises 5 to 20% by weight of the phosphorus containing compound or composition comprising a phosphorus containing compound;
 wherein the intumescent ingredient comprises 10 to 40% by weight expandable graphite.

The intumescent ingredient may comprise 10 to 35% by weight expandable graphite.

The phosphorus containing compound or composition comprising a phosphorus containing compound may comprise ammonium polyphosphate.

The mixture may comprise 6 to 25% by weight of the char reinforcing filler, and preferably the mixture may comprise 7 to 20% by weight of the char reinforcing filler.

The expandable graphite may have a mean particle size about equal to or below 350 µm. The expandable graphite may have an onset of expansion temperature of 160 to 180° C. The expandable graphite may be a blend of two or more grades. Possibly, a first of the grades has a relatively low thermal expansion, and a second of the grades has a relatively high thermal expansion.

The mixture may comprise polydialkylsiloxane which is unreactive with the siloxane polymer.

The siloxane polymer may comprise polydiorganopolysiloxane. Polydiorganopolysiloxane may comprise at least two condensable or hydrolyzable groups. The at least two condensable or hydrolyzable groups may comprise hydroxyl groups or alkoxy groups.

The suitable metallic catalyst may comprise a metallic condensation catalyst, which may comprise a tin based condensation catalyst.

The filler may comprise reinforcing and/or non-reinforcing filler. The mixture may comprise an adhesion promotor. The mixture may comprise a compatibilizer.

According to various, but not necessarily all, examples of the disclosure there is provided an intumescent coating material, wherein the intumescent coating material is the cured reaction product of a mixture comprising:
 a siloxane polymer;
 a cross-linker for cross-linking the siloxane polymer;
 filler, wherein the filler comprises char reinforcing filler; and
 an intumescent ingredient, wherein the intumescent ingredient comprises a phosphorus containing compound or a composition comprising a phosphorus containing compound, wherein the mixture comprises 5 to 20% by weight of the phosphorus containing compound or composition comprising a phosphorus containing compound;
 wherein the intumescent ingredient comprises 10 to 40% by weight expandable graphite.

According to various, but not necessarily all, examples of the disclosure there is provided a method, the method comprising mixing:
 a siloxane polymer;
 a cross-linker for cross-linking the siloxane polymer;
 filler, wherein the filler comprises char reinforcing filler; and
 an intumescent ingredient, wherein the intumescent ingredient comprises a phosphorus containing compound or a composition comprising a phosphorus containing compound, wherein the mixture comprises 5 to 20% by weight of the phosphorus containing compound or composition comprising a phosphorus containing compound; wherein the intumescent ingredient comprises 10 to 40% by weight expandable graphite;
 the method further comprising allowing the mixture to cure in the presence of a suitable metallic catalyst to provide an intumescent coating material.

According to various, but not necessarily all, examples of the disclosure there is provided an intumescent coating for protecting a substrate, the intumescent coating comprising an intumescent coating material, wherein the intumescent coating material is the cured reaction product of a mixture comprising:
 a siloxane polymer;
 a cross-linker for cross-linking the siloxane polymer;
 filler, wherein the filler comprises char reinforcing filler; and
 an intumescent ingredient, wherein the intumescent ingredient comprises a phosphorus containing compound or a composition comprising a phosphorus containing compound, wherein the mixture comprises 5 to 20% by weight of the phosphorus containing compound or composition comprising a phosphorus containing compound;
 wherein the intumescent ingredient comprises 10 to 40% by weight expandable graphite.

The intumescent coating may comprise a plurality of layers of the intumescent coating material.

According to various, but not necessarily all, examples of the disclosure there is provided a method of protecting a substrate, the method comprising:
coating the substrate with a mixture curable in the presence of a suitable metallic catalyst to provide an intumescent coating material, wherein the mixture comprises:
a siloxane polymer;
a cross-linker for cross-linking the siloxane polymer;
filler, wherein the filler comprises char reinforcing filler; and
an intumescent ingredient, wherein the intumescent ingredient comprises a phosphorus containing compound or a composition comprising a phosphorus containing compound, wherein the mixture comprises 5 to 20% by weight of the phosphorus containing compound or composition comprising a phosphorus containing compound;
wherein the intumescent ingredient comprises 10 to 40% by weight expandable graphite;
the method further comprising allowing the mixture to cure in the presence of the suitable metallic catalyst to provide a protected substrate.

The method may comprise providing the substrate with a plurality of layers of the intumescent coating material.

According to various, but not necessarily all, examples of the disclosure there is provided a protected substrate, the substrate comprising an intumescent coating comprising an intumescent coating material, wherein the intumescent coating material is the cured reaction product of a mixture comprising:
a siloxane polymer;
a cross-linker for cross-linking the siloxane polymer;
filler, wherein the filler comprises char reinforcing filler; and
an intumescent ingredient, wherein the intumescent ingredient comprises a phosphorus containing compound or a composition comprising a phosphorus containing compound, wherein the mixture comprises 5 to 20% by weight of the phosphorus containing compound or composition comprising a phosphorus containing compound;
wherein the intumescent ingredient comprises 10 to 40% by weight expandable graphite.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only.

DETAILED DESCRIPTION

Siloxane Polymer

A siloxane polymer according to examples of the disclosure may be described by the following molecular Formula (1):

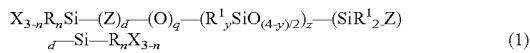

(1)

Wherein d is 0 or 1 q is 0 or 1 and d+q=1
where n is 0, 1, 2 or 3, z is an integer from 300 to 5000 inclusive, y is 0, 1 or 2, and preferentially 2. At least 97% of the $R^1{}_y SiO_{(4-y)/2}$ are characterized with y=2. X is a hydroxyl group or alkoxy group or any condensable or any hydrolyzable group, R is individually selected from the group consisting of aliphatic, alkyl, aminoalkyl, polyaminoalkyl, epoxyalkyl, alkenyl or aromatic aryl groups and $R^1$ is individually selected from the group consisting of X, aliphatic, alkyl, alkenyl and aromatic groups.

The siloxane polymer can be a single siloxane represented by Formula (1) or it can be mixtures of siloxanes represented by the aforesaid formula or solvent/polymer mixtures. The term "polymer mixture" is meant to include any of these types of polymers or mixtures of polymers.

Each X group may be the same or different and can be a hydroxyl group and any condensable or hydrolyzable group. The term "hydrolyzable group" means any group attached to the silicon which is hydrolyzed by water at room temperature. The hydrolyzable group X includes groups of the Formula —OT, where T is any hydrocarbon or halogenated hydrocarbon group, such as methyl, ethyl, isopropyl, octadecyl, allyl, hexenyl, cyclohexyl, phenyl, benzyl, beta-phenylethyl; any hydrocarbon ether radical, such as 2-methoxyethyl, 2-ethoxyisopropyl, 2-butoxyisobutyl, p-methoxyphenyl or —(CH$_2$CH$_2$O)$_2$CH$_3$; or any N,N-amino radical, such as dimethylamino, diethylamino, ethylmethylamino, diphenylamino or dicyclohexylamino.

The most preferred X groups of the invention are hydroxyl groups or alkoxy groups. Illustrative alkoxy groups are methoxy, ethoxy, propoxy, butoxy, isobutoxy, pentoxy, hexoxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

R is individually selected from the group consisting of aliphatic, alkyl, aminoalkyl, polyaminoalkyl, epoxyalkyl, alkenyl organic and aromatic aryl groups. Most preferred are the methyl, ethyl, octyl, vinyl, allyl and phenyl groups.

$R^1$ is individually selected from the group consisting of X, aliphatic, alkyl, alkenyl and aromatic aryl groups. Most preferred are methyl, ethyl, octyl, trifluoropropyl, vinyl and phenyl groups. It is possible that some $R^1$ groups may be siloxane branches off the polymer backbone which may have terminal groups as hereinbefore described.

Z is independently a saturated, bi-valent aliphatic radical of the type of $C_w H_{2w}$ where w is 2 or more, alternatively w is from 2 to 10.

Siloxane polymer according to examples of the disclosure may be present in the form of a single polymer, or as a blend of different degrees of values of z in formula (1) above.

The Degree of Polymerization or DP, is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average (DP) and the weight average, Mw. The DP and Mw of silicone can be determined by Gel permeation chromatography (GPC) with precision of about 10-15%. This technique is standard and yields Mw (weight average), Mn (number average) and polydispersity index (PI). DP=Mn/Mu where Mn is the number-average molecular weight coming from the GPC measurement and Mu is the molecular weight of the monomer unit. PI=Mw/Mn. The DP is linked to the viscosity of the polymer via Mw, the higher the DP, the higher the viscosity.

Typically Log(Viscosity)=3.70 log (Mw)−16.3 for Mw between 13000 and 70000. (Mills, E., European Polymer Journal, 1969, 675-695, see specifically pages 682 and 683, FIG. 4 and equation 14.)

Siloxane polymers are otherwise known as silicone polymers.

Polydialkylsiloxane

In some example of the disclosure, the mixture may comprise polydialkylsiloxane which has the general formula:

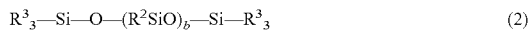 (2)

Where $R^2$ is an alkyl or phenyl group as hereinbefore described may optionally be present, typically these are polydimethylsiloxanes which are unreactive with the siloxane polymer of the composition, such as polydimethylsiloxane in which each $R^2$ is a methyl group and each $R^3$ groups are, for example, methyl, vinyl or phenyl or combinations of these groups. Such polydimethylsiloxanes used generally have a viscosity of from about 5 to about 100,000 mPa·s at 25° C., i.e. b is an integer which provides this viscosity range. Typically, polydialkylsiloxane is linear but it may contain a degree of branching.

Polydialkylsiloxane is unreactive with siloxane polymer.

Cross-Linker

Any suitable cross-linker may be used. The cross-linker in the curable mixture as hereinbefore described may be one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, isobutoxy and propoxy) and alkenyloxy groups (for example isopropenyloxy and 1-ethyl-2-methylvinyloxy).

In the case of siloxane based cross-linkers the molecular structure can be straight chained, branched, or cyclic.

The crosslinker preferably has at least three or four silicon-bonded condensable (preferably hydroxyl and/or hydrolysable) groups per molecule which are reactive with the condensable groups in siloxane polymer. When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as crosslinkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

Alternatively, cross-linkers may comprise a silyl functional molecule containing two or more silyl groups, each silyl group containing at least one hydrolysable group, the total of hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain. The cross-linker may be a disilyl functional polymer, that is, a polymer containing two silyl groups, each containing at least one hydrolysable group such as described by $R^3_{3-a}Si(X)_a$-Rv-$Si(X)_eR^3_{3-e}$ where $R^3$ and X are individually selected and are described above. Subscripts a and e are independently an integer of 1, 2 or 3, alternatively 2 or 3. Rv is a divalent hydrocarbon radical, alternatively a divalent hydrocarbon radical having from 1 to 10 carbon atoms, or further alternatively 1 to 6 carbon atoms or a combination of said divalent hydrocarbon radicals and divalent siloxane radicals. Preferred di-silyl cross-linkers have a and/or e=3 or 2, X=OMe and Rv being a divalent saturated hydrocarbon radical with 4 to 6 carbons.

The silyl (e.g. disilyl) functional crosslinker may have a siloxane or organic polymeric backbone. In the case of such siloxane or organic based cross-linkers the molecular structure can be straight chained, branched, cyclic or macromolecular. In the case of siloxane based polymers the viscosity of the cross-linker will be within the range of from 0.5 mPa·s to 80,000 mPa·s at 25° C.

Examples of disilyl polymeric crosslinkers with a silicone or organic polymer chain bearing alkoxy functional end groups include polydimethylsiloxanes having at least one trialkoxy terminal where the alkoxy group may be a methoxy or ethoxy group.

Examples might include or 1,6-bis(trimethoxy silyl) hexane hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane.

The amount of cross-linker present in the composition will depend upon the particular nature of the cross-linker and in particular, the molecular weight of the molecule selected. The compositions suitably contain cross-linker in at least a stoichiometric amount as compared to the polymeric material described above.

Suitable Metallic Catalyst

A suitable metallic catalyst according to examples of the disclosure may comprise tin based condensation catalyst. Such catalysts catalyse the polymerisation reaction. Suitable tin based catalyst comprise tin triflates, organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bis-neodecanoate, dibutyltin dibenzoate, stannous octoate, dimethyltin dineodecanoate (DMTDN) and dibutyltin dioctoate.

Filler

In examples of the disclosure filler may be one or more suitable reinforcing filler(s) or a combination of suitable reinforcing fillers and non-reinforcing fillers. Filler may also comprise mineral filler (see below)

The addition of an active filler to improve the elastomer's mechanical properties, such as modulus, tensile strength or elongation at break, is known as reinforcement. The use of reinforcing fillers improves both the strength and stiffness characteristics of the cross-linked (i.e. cured) polymer. Filled cross-linked polymer has significantly higher stiffness than unfilled cross-linked polymer at the same degree of deformation. Furthermore, filled cross-linked polymer has as well a considerably higher strength and deformation to break than unfilled analogue.

Non-reinforcing fillers have the function to adjust the viscosity and processability of the mixture in the non-cured state and, for example, achieve specific colour of the final material.

It is commonly considered that materials with high specific surface area, well dispersible in the silicone polymers will provide better reinforcement. The high specific surface area is usually determined by the nitrogen adsorption method based on Brunauer-Emmett-Teller theory or known in the art as BET method. Specific values herein are taken from suppliers data (e.g. Evonik) and is typically between 10 and 400 $m^2/g$. The ability of a filler to reinforce (or not) is typically provided on the technical specification by the manufacturer. Alternatively, a simple curable mixture might be prepared and the reinforcing quality of the filler can be used in the determination of tensile strength, elongation at break [%] and hardness of the cured material. Details and sample formulations for testing are provided in "Technical Bulletin Fine Particles 63", available from EVONIK. For the purpose of this disclosure we have defined the BET specific surface area of max 100 $m^2/g$ as a cut-off between the non-reinforcing (BET specific surface area below or equal to 100 $m^2/g$ (using ISO 5794/1, annex D for at least silica) and reinforcing (BET specific surface area above 100 $m^2/g$) fillers using DIN 66131 (1993-07) for at least silica).

Examples of suitable reinforcing filler include but are not restricted to high surface area fumed and precipitated silicas and/or precipitated or ground calcium carbonate.

The content of the reinforcing filler may be between about 5 and 35% by weight of the total mixture. The said fillers are typically treated prior to use or in-situ.

The surface treatment of the reinforcing filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with their sealant components.

The surface treatment of the fillers makes the fillers e.g. ground calcium carbonate and/or precipitated calcium carbonate easily wetted by the silicone polymer. Typically surface modified fillers do not clump and can be homogeneously incorporated into the silicone polymer. This results in improved room temperature mechanical properties of the uncured mixtures. The filler(s) may for example be precipitated silica, ground calcium carbonate and/or precipitated calcium carbonate each of which has independently been treated by a treating agent discussed above, typically stearic acid or a stearate.

Carbon black can also be used as reinforcing filler (for the avoidance of doubt in this application carbon black fillers do not include expandable graphite)

Reinforcing silica is preferentially fumed hydrophobic silica. It is available for example from Evonik under the name of Aerosil® 972, Aerosil® 974, Aerosil® 812. This list is not exhaustive. Increasing the amount of the reinforcing silica rapidly increases the thixotropic character and non-sag properties of the material. Industry Information—"Technical Bulletin Fine Particles 63" available from Evonik.com provides further examples and guidance on the use of silica.

Non reinforcing silica can be both fumed and precipitated. Silica with hydrophobized surface may be used in order to facilitate the incorporation in the matrix. Examples include (non-exhaustive list) Aerosil® R9200, Sipernat® D10, Sipernat® D13, Sipernat® D17 also from Evonik.

Other fillers which are largely non-reinforcing may be used. These include but are not restricted to zinc borate, and titanium oxide ($TiO_2$).

Char Reinforcing Filler

Curable mixtures according to examples of the disclosure comprise a char reinforcing filler. Example char reinforcing fillers comprise fibers or micron to millimeter sized particles which do not melt at a temperature below 500° C. Curable mixtures according to examples of the disclosure comprises about 6 to about 25% by weight char reinforcing filler, or may comprise about 7 to about 20 by weight char reinforcing filler. Char reinforcing fillers may be selected from a group comprising: fibres, such as basalt fibers, glass beads, frit, such as glass frit zeolite, clays, Vermiculite, Rock Force® MS603, Rock Force® MS 605 and Rock Force® MS615, and Enfil grade fibers from Morgan Ceramics (non-exhaustive list).

The char reinforcing filler improves the consistency of the char.

Intumescent Ingredient

An intumescent ingredient is a mixture of compounds which contribute to the formation of a protective char when a cured material comprising the intumescent ingredient is subjected to a fire event.

In examples of the disclosure, the intumescent ingredient comprises at least a phosphorus containing compound or a composition comprising a phosphorus containing compound and expandable graphite. In some examples, the intumescent ingredient may also comprise other compounds as detailed below, such as a blowing agent and a char forming additive.

Expandable Graphite

Expandable graphite, which can also be referred to as intercalated graphite or foamable graphite, is present in an amount of about 10 to about 40% by weight of the intumescent ingredient. Accordingly, the intumescent ingredient comprises about 10 to about 40% by weight expandable graphite. In some examples, the intumescent ingredient comprises about 10 to about 35% by weight expandable graphite Expandable graphite is typically made via intercalation. Intercalation is a process whereby a material (intercalant) is inserted between the graphene layers of a graphite crystal or particle. A wide variety of chemical species have been used to intercalate graphite materials.

Particularly useful grades have a maximum mean particle size of 350 μm. The expandable graphite can be a blend of two or more grades. Particularly useful are grades with onset of expansion of 160-180° C. At temperatures above the onset of expansion the graphite serves as intumescent (or spumific) agent. The material substantially increases in volume converting the protective coating into a thicker insulating char.

Typically, expandable graphite is characterized mainly, but not exclusively by:
(a) Expansion or expansion volume; this is the volume filled by one gram of graphite in fully expandable state. Typically, this is quantified in $cm^3/g$ or alternatively in ml/g.

(b) Onset temperature (alternatively "start temperature"); is the temperature at which the expansion typically starts to develop. Typically, this value falls between 100 and 300° C.
(c) Particle size. Typically, the mean size or a specific cut-off size is provided. This can be measured by sieving. During sieving the sample is subjected to horizontal or vertical movement which causes a relative movement between the particles and the sieve. Depending on their size the individual particles either pass through the sieve mesh or are retained on the sieve surface.

Further characteristics also include: type of intercalant, concentration of intercalant, purity, surface treatment etc. Data on intercalant, particle size and onset of expansion is typically provided by the manufacturer. Having smaller particles size, as well as predominantly low-expansion graphite, is beneficial for the char consistency.

Particularly useful grades have sizes equal or below 350 μm. Particularly useful are grades with onset of expansion of 160-180° C.

The grades are further specified in the examples. Unless stated otherwise, the onset temperature of expansion was between 160 and 180° C. as per manufacturer's description.

The expandable graphite may be present in a single grade but alternatively may be present in two or more grades. For example, in one example two grades of graphite may be included in the curable mixture wherein the first grade has a relatively low thermal expansion, and the second grade has a relatively high thermal expansion. In yet another example the curable mixture is executed as a two-part mixture. In this case it is beneficial to add the expandable graphite to the part which does not contain the tin catalyst.

Typical suppliers (non-exhaustive list) include; Graphitwerk Kropfmuehl AG, Graphtek, LKAB Minerals etc.

It is useful to adjust the char expansion and char consistency by varying the particle size and expansion ratio of the expandable graphite.

Phosphorus Containing Compound or a Composition Comprising a Phosphorus Containing Compound The mixture comprises about 5 to about 20% by weight of a phosphorus containing compound or a composition comprising a phosphorus containing compound, and may comprise about 10 to about 20% by weight of a phosphorus containing compound or composition comprising a phosphorus containing compound.

The phosphorus may be selected from red phosphorus, ethylenediamine phosphatemalamine phosphate, melamine pyrophosphate, melamine polyphosphate or and ammonium phosphate. Suitable ammonium phosphate may be selected from monoammonium phosphate, diammonium phosphate, ammonium hypophosphate, ammonium orthophosphate, ammonium mono and dihydrogen phosphate or ammonium polyphosphate (APP) or a mixture thereof. Preferentially this is in powder form and has low water solubility.

Preferably, the phosphorus containing compound is APP. Alternatively, the phosphorus containing compound may be in the form of a composition comprising the aforementioned together with a blowing agent and/or a char forming additive such as for example THEIC as described herebelow.

The blowing agent is preferably a nitrogen containing compound which releases large amounts of gas under the influence of heat. Urea, melamine, guanidine, dicyandiamide, butyl urea, glycine, benzene sulfonyl hydrazine, chlorinated paraffin, cyanuric acid, benzoguanamine, melamine cyanurate and hydroxyalkyl-amino-s-triazines are illustrative examples of typical blowing agents, but melamine is particularly preferred. In some cases, the blowing aging is also referred to as "booster".

In the case of APP, it can be used for flameproofing combustible synthetic resins and wood, for instance. To this end, use is commonly made of a water-insoluble APP with a view to ensuring that the APP will not be dissolved out from the material which is to be protected, and with a view to producing in this way a reliable permanent flame-retardant effect. Water-insoluble APP can be represented by the simplified formula $(NH_4PO_3)_n$, in which n is 20 to 1000, preferably 200 to 800, and it can be made, for example, by the process described in German Patent Specification ("Offenlegungsschrift") No. 2,330,174.

When the phosphorus containing compound, e.g. APP is pre-blended with e.g. a blowing agent, the blowing agent functions as an organic component which upon exposure to heat, decomposes generating volatile inert gases. When present, the blowing agent generally comprises from about 5 to about 40% by weight of the composition comprising a phosphorus containing compound.

Char Forming Additive

A char forming additive may be selected from tris (hydroxyalkyl) isocyanurates wherein the alkyl group may contain from 1 to 10 carbons which may be either linear or branched. Typical examples of such char forming additives are the methyl, ethyl, propyl, butyl, pentyl or hexyl-tris (hydroxyalkyl) isocyanurates, preferably tris (2-hydroxyethyl) isocyanurate (THEIC).

Adhesion Promoter

In some examples, the mixture may comprise an adhesion promoter. An example of adhesion promotor is a methoxy group-containing carbasilatrane derivative such as described in WO2007037552

Another example is an aminoalkylmethoxysilane of the formula $R-N(H)-R^4-Si-(OR^5)_{3-f}R^6_f$ where R is preferentially H or an amine radical of the type $NH_2-C_gH_{2g}-$; $R^4$ is $C_hH_{2h}$, $R^5$ is $C_jH_{2j+1}$, $R^6$ is hydrocarbon which can be also unsaturated and has between 1 and 4 carbon atoms. Preferentially f is 0, 1 or 2, g is between 1 and 6, h is between 2 and 7 and j is from 1 to 3, preferentially 3.

In other examples, the adhesion promotor may comprise a mixture of the above.

Compatibilizers

Compatibilizers are typically small molecules and or oligomers with preferentially amphiphilic character which can be used to improve the incorporation of the different dry materials into the siloxane polymer. These could be non-ionic emulsifiers of general structure CxEy, where Cx stands for a saturated, linear or branched, aliphatic chain of x carbon atoms and Ey stands for an oligomeric block of Y oxyalkylene units illustrated by the average formula $(-CnH2n-O-)_Y$ wherein n is an integer from 2 to 4 inclusive and subscript Y is an integer between 4 and 30. Typically X is between 8 and 30.

Additional Optional Ingredients

Further to the aforementioned materials the composition might also comprise other ingredients intended to improve the char consistency and/or provide fire retardancy. A non-exhaustive list of compound used to strengthen the char comprises basalt fibres, vermiculite, clay, mica and glass frit. Typical fire retardants, are PCPIMO and Reophos available form Prometheus Ltd and Chemtura/LanXess respectively. PCPIMO is a phosphorous based liquid fire retardant polymer containing both the acid source, gas source and the char promoter in a single polymeric molecule. Reophos is a synthetic phosphate fire retardant.

Vermiculite/mica are inert fillers with high temperature stability. These may have a micronized particle size with a pH between 6-9. Surface treatment might include a silane, or none.

Glass Frit: inert glass frit to harden/ceramify during the burn and reinforce/strengthen the char. Melting point between 400-800° C.

EXAMPLES

In one example of the disclosure, a mixture may be prepared comprising the following components:

1. Polydiorganopolysiloxane comprising at least two condensable or hydrolyzable groups
2. Polydialkylsiloxane
3. Filler
4. Mineral filler
5. Expandable graphite
6. A phosphorus containing compound or a composition comprising a phosphorus containing compound
7. Adhesion promotor
8. Tin based condensation catalyst
9. Cross-linker In examples of the disclosure, the mixture may be prepared by addition of the components in the following order: 1 and 2, followed by 3, followed by 4, 5 and 6, followed by 7, followed by 8 and 9.

In other words, the adhesion promoter, cross-linker and the tin based condensation catalyst are added to the mixture last, and preferably in the order described above. Advantageously, this order of addition prevents the mixture curing before all the components have been added to the mixture.

Alternatively, in some examples the tin based condensation catalyst and the cross-liker (and optionally the adhesion promoter) may be combined in a "curing agent", whereas all other ingredients can be combined in a "base".

A Hauschield mixer model DAC 400.1 FVZ, or planetary mixers may be used to prepare mixtures according to examples of the disclosure.

In some examples, the mixture may be present in two or more parts, as outlined in one of the examples below.

Example Applications of the Mixture to a Substrate to Form an Intumescent Coating A mixture according to the disclosure is typically applied on a steel substrate to form a protective intumescent coating once cured. Alternatively, a mixture could be applied, for example, on substrates such as wood, cement, reinforced concrete or glass. The surface of the substrate should be dust and oil free. Preferably, the temperature of application should be between about −5 and about 50° C. Any water on the surface of the substrate should preferably be removed.

Prior to applying the mixture to the substrate, the surface of the substrate may be pre-treated, for example, with rust-protection paint/coating in the case of steel, or fungicidal agents in the case of wood.

In some example, a primer may be applied to the surface of the substrate to enhance adhesion. An example of suitable primer is DOWSIL™ 1200 s from Dow Silicones Corporation.

Explanation of Terms

Durable Coating

For the purpose of the present disclosure 'durable coating' means a coating which, once cured, is able to withstand three weeks weathering test without showing more than 50% adhesive failure in the last step (step 3 below).

Adhesive failure (AF) refers to the situation when the coating detaches cleanly (peels off) from the substrate. Cohesive failure (CF) is observed when the coating itself breaks without detaching from the substrate (for example, steel plate). In some cases, a mixed failure mode may be observed; that is some areas peel-off (i.e. AF) while some remain covered with coating (i.e. CF). In such cases, the portions of surface displaying CF (% CF) and AF (% AF) behaviour have been determined. Obviously % CF+% AF=100%.

The sequence of adhesion tests defining durability (i.e. three weeks weathering test) is herewith described and executed in the following order on physically the same specimen. When several specimens are being tested (replication) at least 75% of them should pass.

1. 1 week Room Temperature (RT) (RT is 20 to 25° C.) and about 50% relative humidity. Necessary is 100% Cohesive failure
2. 1 week Room Temperature (RT) (RT is 20 to 25° C.) and full immersion in water, followed by 24 hours drying at RT and about 50% relative humidity. Necessary is 100% Cohesive failure
3. 1 week High Temperature (this is between 45 and 55° C.) and full immersion in water, followed by 24 hours drying at RT and about 50% relative humidity. Necessary is at least 50% Cohesive failure When several equivalent specimens are tested (replication) the number of failing specimens should be below 20% of the total number of tested specimens.

Coating Expansion

Coating expansion is defined as: $Exp=((Hch-Hco)/Hco))*100\%$.

Where Hch is the height of the developed char, Hco is the height of the coating at application.

Minimal acceptable coating expansion is 200%

When several equivalent specimens are tested (replication) the number of failing specimens should be below 20% of the total number of tested specimens.

Solid Char

For the purpose of the present disclosure a 'solid char' means a char with sufficient internal cohesion (consistency) which adheres to the substrate. Both char consistency and char adhesion (see below) are necessary for effective protection of the substrate in the event of fire. To ensure adequate protection, the char should remain in place without attrition and detachment.

Char Consistency

Char consistency is determined by punching the fully developed char, which had been cooled to RT with a spatula. A score from 0 to 4 (where 1 means very soft and 4 means very hard; see below) is ascribed to the char based on the resistance faced during punching.

0=the char represents a pile of ashes
1=not a pile of ashes, but little to no resistance to punch
2=resistance to punch observed
3=substantial resistance of punch observed
4=cannot be easily punched A char consistency is deemed sufficient when resistance is faced and the score is at least 2, preferentially 3. Too fluffy chars will easily fall off (in particular from vertical substrates) thus leaving the latter without heat protection.

When several equivalent specimens are tested (replication) the number of failing specimens should be below 20% of the total number of tested specimens.

Char Adhesion

Char adhesion is determined immediately after the assessment of the char consistency. The char is removed from the plate using a spatula or a small scraper. Following this test, the chars were classified in three categories, namely:

1. "poor"=falls off without force, no residue on the test substrate
2. "acceptable"=some force required to remove the char, and residue remains on the test substrate
3. "good"=substantial force required to remove the char, and residue remains on the test substrate.

In practice, at least "acceptable" on this score (together with at least 2 on char consistency) is necessary to avoid the char falling off the surface of the substrate.

SPECIFIC EXAMPLES

Ingredients Used

Silicones polymers of different DP (see above) were from Dow Silicones Corporation.

Unless stated otherwise in all example hereafter, reinforcing silica was hydrophobic fumed silica post-treated with Dimethyldichlorosilane based on a hydrophilic fumed silica with a specific surface area of 105-190 $m^2/g$ in accordance with DIN 66131 (1993-07).

Unless stated otherwise in all examples hereafter, non-reinforcing silica was precipitated, milled hydrophobic silica, silica of mean size between 4 and 6.5 microns with BET surface area of 90 $m^2/g$ using ISO 5794/1, annex D.

$CaCO_3$ can be grounded or precipitated. The material can be treated by stearic acid. This is available, for example, from Solvay Imerys or Omya. The $CaCO_3$ used in the examples was surface treated with stearic acid. The mean particle size was 60-70 microns, and BET surface area was 18-20 $m^2/g$ as per manufacturer's data.

Zn Borate is available form Chemtura $TiO_2$ is finely divided titanium dioxide. This is readily available from Huntsman/Tioxide, DuPont, etc. the grade TiPure R-706 (DuPont) was used in all experiments.

Ammonium polyphosphate (APP) is preferentially powder with low moisture content. This material is available, as for example, from Clariant under Exolite 422 trade name. APP may optionally contain an additive as discussed above, as for example Exolite AP740 from Clariant.

A mineral filler used was mineral fibers from Morgan Ceramics, available under the trade name Enfil SH or Fibers Rock Force Roxul 605 available from Lapinus.

A tin based catalyst was used (in particular, DiMethyl Tin Di Neodecanoate, DMTDN), or alternatively a sealant curing agent containing the tin based catalyst and the Cross-linker.

Methodology

Durability of the Protective Coating

Approx. 6×4 cm smears casted on stainless steel were left to cure for 7 days at room temperature (RT). Then a 0.5 cm undercut as close as possible to the steel plate was made. The coating is then manually pulled and type of failure is recorded, i.e. Adhesive failure (AF), Cohesive failure (CF), or mixed failure (see explanation above)

For 1 week storage at RT only 100% CF is acceptable.

When a sample passes the 1 week RT adhesion test, it (physically the same sample) is stored for 1 week under water at 23° C. Then it is left to dry for 24 hours at RT and the adhesion test described in the above paragraph is repeated. At this stage, only samples with 100% CF are deemed acceptable.

When a sample passes 1 week RT adhesion test as well as the 23° C. under water test, it (physically the same sample) is then stored under water at 45 to 55° C. for one week. Then it is left to dry for 24 hours at RT and the adhesion test described in the above paragraphs is repeated. At this stage, only samples with at least 50% CF are deemed acceptable.

A durable coating is expected to withstand the entire sequence of 3 adhesion tests.

Char Development

Two methods of char development were used as follows.

Method 1

Steel plates with 5×5 cm (10 mm thickness) coating have been placed into a pyrolytic oven and heated to 500° C. at highest possible rate. The oven was then maintained at 500° C. for 2 hours. The oven was then switched off and the resulting char was allowed to cool to room temperature (RT)—typically for 10-12 h. Then the char's height was measured, followed by the assessment of the char's consistency and char adhesion as discussed below. This method was used for all examples apart from C11 and E11.

Method 2

A thermocouple has been welded to the back of a stainless steel plate (dimension 10×10 cm. The plate was then fully covered by 8-10 mm thick coating which was left to cure completely. The plate was then subjected to fire test under the conditions of hydrocarbon fire, defined as for example in FIG. 3.1 in UL1709 test, edition $4^{th}$ from 2011. The temperature increase of the back of the plate has been recorded and the experiment was stopped when the temperature was above 500° C. The oven was then left to cool down to RT and the char's height was measured, followed by the assessment of the char's consistency and char adhesion as discussed below. This method was used for C11 and E11

Coating Expansion

Coating Expansion is determined as indicated above.

As noted, the minimal acceptable coating expansion is 200%. Accordingly, the acceptable char heights of coatings applied at 1 cm is a minimum of 3 cm. Char height was measured on cold char prior to assessing the consistency and adhesion.

Char Consistency

Char consistency was determined as indicated above.

In case of very low scores (0 and 1) on char consistency, the sample has been directly discarded.

Char Adhesion

The adhesion of the fully developed char to the steel plate was determined immediately after the assessment of the char consistency. The char was removed from the plate using a spatula or a small scraper.

The chars were classified as described above.

Only chars with "acceptable" and "good" adhesion were considered practically relevant.

In some cases, the char detaches from the plate during the fire test. This is easily seen either by the abrupt increase of the backside temperature of the plate or by the visual inspection of the cooled char. These materials are obviously not useful.

Snap Time

Snap time is measured by gently approaching on regular time intervals (typically 2-3 min) a spatula to the surface of the curing sealant. As the cure progresses, the coating gains viscosity and elasticity. When these two are sufficiently high, the coating snaps-off the spatula. The time elapsed between the casting of the coating and the first observation of the snap-off effect is recorded as snap time. This value has practical importance, because it provides indication about the working time of the coating. For the purpose of this disclosure the working time is defined as the time which the applicator is able to work with the material before the latter reaches such a state of high viscosity that it cannot be properly handled and tooled and snap time is used as rough estimation for the open time.

It has been found that a snap time from about 10 to about 60 minutes is the optimal for practical use. Shorter opening times preclude the operator from properly applying the coating, whereas long opening times characterized by a delayed cure may lead to sag, for example.

Practically Useful Intumescent Coatings

In examples of the disclosure, it has been surprising found that practically useful intumescent coatings must simultaneously exhibit the three above-mentioned characteristics that is coating durability (upon exposure to fire or temperature above 500° C.), an expansion above 200%, and have a solid char.

The chars are considered solid when they present simultaneously a sufficient internal cohesion to remain in place without attrition, and capability to adhere to the surface of the substrate they protect.

Accordingly, if a test sample failed to meet the three above-mentioned characteristics, the sample was directly discarded and no further tests were performed.

Specific Examples of the Disclosure and Properties Thereof

Examples C1 to C8 in table 1 below are comparative examples, whereas examples Ex1 to Ex5 are examples according to the disclosure. All numbers are weight percent.

Column 10 indicates the % of intumescent ingredient with respect to the mixture, i.e. the % by weight of the intumescent ingredient in the mixture. Column 11 indicates the % of expandable graphite with respect to the intumescent ingredient, i.e. the % by weight of the expandable graphite in the intumescent ingredient.

By way of example, the mixture of EX1 comprises 78% by weight Base 1 plus curing agent, 5% by weight expandable graphite, 10% by weight APP, and 7% by weight Fibre enfil. Accordingly, the mixture comprises 100% by weight of the above components. The intumescent ingredient comprises the expandable graphite (5% by weight) and APP (10% by weight), which is in total 15% by weight as indicated in column 10. Accordingly, in this example the mixture comprises 15% by weight of the intumescent ingredient. Furthermore, the mixture comprises 10% by weight APP (i.e. the phosphorus containing compound or composition comprising a phosphorus containing compound). In this example, the intumescent ingredient comprises 33.33 by weight expandable graphite. This is determined by dividing the amount of expandable graphite (% by weight) in the mixture by the total amount of the amount of intumescent ingredient in the mixture (% by weight) and multiplying by 100, i.e in this example 5+15×100=33.33.

TABLE 2

| 1 | 2 | 3 |
|---|---|---|
| Ingredient | base 1 | base 2 |
| dimethylhydroxy end-capped polydimethylsiloxane (DP of 580 +/− 10%) | 100 | 100 |
| dimethylhydroxy end-capped polydimethylsiloxane (DP of 300 +/− 10%) | 39.5 | 39.5 |

TABLE 1

| 1 Example type | 2 Base 1 + curing agent 1 at mass ratio 7.4 to 1 | 3 Base 2 + curing agent 2 at mass ratio 7.4 to 1 | 4 EG 250 cm³/g, 350 μm (Graphtek) | 5 APP, Exolite 422, | 6 AAP + booster (Exolite 740S) | 7 Stearic acid treated CaCO₃ | 8 Zn Borate | 9 Fibre Enfil | 10 % by weight intumescent ingredient in the mixture | 11 % by weight of expandable graphite with respect to the intumescent ingredient |
|---|---|---|---|---|---|---|---|---|---|---|
| C1 | 68 | | 15 | 10 | 0 | 0 | 0 | 7 | 25.00 | 60.00 |
| C2 | 58 | | 15 | 20 | 0 | 0 | 0 | 7 | 35.00 | 42.86 |
| C3 | 73 | | 0 | 20 | 0 | 0 | 0 | 7 | 20.00 | 0.00 |
| C4 | 80 | | 0 | 20 | 0 | 0 | 0 | 0 | 20.00 | 0.00 |
| C5 | 73 | | 0 | 0 | 20 | 0 | 0 | 7 | 20.00 | 0.00 |
| C6a | 70.5 | | 2.5 | 0 | 20 | 0 | 0 | 7 | 22.50 | 11.11 |
| C6b | 68 | | 0 | 20 | 0 | 5 | 0 | 7 | 20.00 | 0.00 |
| C7 | | 68 | 15 | 10 | 0 | 0 | 0 | 7 | 25.00 | 60.00 |
| C8 | | 58 | 15 | 20 | 0 | 0 | 0 | 7 | 35.00 | 42.86 |
| EX1 | 78 | | 5 | 10 | 0 | 0 | 0 | 7 | 15.00 | 33.33 |
| EX2 | 68 | | 5 | 20 | 0 | 0 | 0 | 7 | 25.00 | 20.00 |
| EX3 | 70.5 | | 2.5 | 20 | 0 | 0 | 0 | 7 | 22.50 | 11.11 |
| EX4 | 70.5 | | 2.5 | 20 | 0 | 0 | 0 | 7 | 22.50 | 11.11 |
| EX5 | 68 | | 5 | 10 | 0 | 0 | 10 | 7 | 25.00 | 20.00 |

Column 1 above indicates whether the example is a comparative example or an example according to the disclosure.

Columns 2 and 3 represent different mixtures (and quantities thereof in weight %). In column 2, the mixture has been formed from base 1 and curing agent 1, whereas in column 3 the mixture has been formed from base 2 and curing agent 2. The particular constituents of bases 1 and 2 and curing agents 1 and 2 are indicated in table 2. All but comparative examples C7 and C8 comprise the mixture of column 1.

Columns 4 to 9 indicate the other ingredients present in the examples.

TABLE 2-continued

| Titanium dioxide | 6.25 | 6.25 |
|---|---|---|
| Reinforcing Silica | 7.5 | |
| Non-reinforcing silica | 12.5 | 12.5 |
| Carbon black (Printex 60) | | 7.5 |
| methyl -trimethoxysilane | 2.5 | 2.5 |

TABLE 2-continued

| | Curing agent Part | |
|---|---|---|
| | Curing agent 1 | Curing agent 2 |
| DOWSIL ™ 993 HV/GER curing agent | 22.0 | 22.0 |
| DMTDN | 0.12 | 0.06 |

With regard to table 2 above, the mixture of columns 2 and 3 of table 2 are two-part mixtures, wherein the first part is referred to as 'base' and the second part is referred to as 'curing agent'.

The amount of each ingredient in Table 2 is provided in parts by mass (not percentage). The two parts were mixed at 7.4 to 1 (mass ratio) using a speed mixer (Hauschield mixer model DAC 400.1 FVZ) operating at 2300 rpm for 30 seconds.

To prepare the respective examples illustrated in table 1 above, the 'base' (of table 2) was mixed with the extra ingredients indicated in columns 4 to 9 of table 1 (i.e. EG, APP $CaCO_3$, Zn Borate and fibers) as required using Hauschield mixer model DAC 400.1 FVZ operating at 2300 rpm, for 1 minute.

The mixing was repeated under vacuum.

The corresponding curing agent part (of table 2) was added, following by 30 seconds mixing employing the same mixer.

Following mixing, the resulting mixtures C1 to C8 and Ex1 to Ex5 were cast on stainless steel plates at thickness of 8 to 10 mm and size of about 5×5 cm and left to cure for at least 24 h to provide an intumescent coating material.

Intumescent coating material (i.e. the cured product of the mixtures of table 2) of all the examples of table 2 achieved a durable coating, i.e. withstood the entire sequence of 3 adhesion tests described above.

The char was developed using 'method 1' described above in the 'Methodology' section. Table 3 summarizes the characterization of the chars. The criteria used in the characterization are described above. In particular, table 3 indicates the coating expansion and solid char (which depends on char consistency and adhesion) for each of the examples.

TABLE 3

| Example type | Char height, cm (Exp, %) To PASS must be equal or above 200% | Char consistency To PASS must have a score of at least 2 | Char adhesion To PASS must have a score of "acceptable" or "good" |
|---|---|---|---|
| C1 | 6 (500%, PASS) | 0 (FAIL) | Poor (FAIL) |
| C2 | 7.5 (650%, PASS) | 1 (FAIL) | Poor (FAIL) |
| C3 | 1.3 (30%, FAIL) | 4 (PASS) | Poor (FAIL) |
| C4 | 1.3 (30%, FAIL) | 4 (PASS) | Poor (FAIL) |
| C5 | 1.4 (40%, FAIL) | 2 (PASS) | Acceptable (PASS) |
| C6a | 3.5 (250%, PASS) | 1 (FAIL) | Acceptable (PASS) |
| C6b | 1.5 (50%, FAIL) | 4 (PASS) | Good (PASS) |
| C7 | 7 (600%, PASS) | 0 (FAIL) | Poor (PASS) |
| C8 | 7 (600%, FAIL) | 0-1 (FAIL) | Poor (PASS) |
| EX1 | 4 (300%, PASS) | 2 (PASS) | Good (PASS) |
| EX2 | 5.5 (450%, PASS) | 3 (PASS) | Good (PASS) |
| EX3 | 3 (200%, PASS) | 3 (PASS) | Acceptable (PASS) |
| EX4 | 3 (200%, PASS) | 3 (PASS) | Acceptable (PASS) |
| EX5 | 4 (300%, PASS) | 3 (PASS) | Acceptable (PASS) |

In practice, it has been found that an effective (i.e. useful) intumescent coating material must have a char thickness of at least 2 cm (e.g. at least 200% expansion), an index of char consistency of at least 2, and at least acceptable char adhesion. As indicated in table 3 above, the char of all the examples of the disclosure (Ex 1 to Ex5) have these properties, whereas the char of the comparative examples C1 to C8 do not.

Accordingly, it has been concluded that expandable graphite is needed to achieve useful char development. Furthermore, useful char development is achieved when the intumescent ingredient comprises about 10 to about 40% by weight expandable graphite. However, using a large amount of highly expandable graphite (250 cm$^3$/g, particle size above 350 μm) is detrimental for char consistency. Further, char reinforcing filler (for example, fibers) is necessary for char consistency.

Examples C9 and C10 in table 4 below are comparative examples, whereas examples Ex6 to Ex10 are examples according to the disclosure.

Examples 6 to 10 in table 4 are particularly useful for providing a durable and consistent protective coating with sufficient expansion.

The ingredients were mixed in the mixer described above in the following order: Liquid silicones, then dry ingredients, followed by a mixing step under vacuum. In the last step the adhesion promoter and DMTDN were added, followed by a 30 s second mixing at 2300 rpm.

The adhesion promoter used in this example was a condensation product of reactive silanes.

The amounts of each ingredient are given in weight percent (table 4).

TABLE 4

| Material (supplier) | C9 | EX6 | C10 | EX7 | EX8 | EX9 | EX10 |
|---|---|---|---|---|---|---|---|
| dimethylhydroxy end-capped polydimethylsiloxane DP of 580 +/− 10% (Dow Silicones Corp.) | 36.51% | 34.24% | 34.28% | 35.43% | 35.12% | 31.76% | 31.76% |
| dimethylhydroxy end-capped polydimethylsiloxane DP of 300 +/− 10% (Dow Silicones Corp.) | 14.43% | 13.52% | 13.54% | 13.99% | 13.87% | 11.91% | 11.91% |
| trimethyl siloxy end-capped polydimethylsiloxanesilicone DP of 550 +/− 10% (Dow Silicones Corp.) | 4.86% | 5.50% | 5.51% | 5.59% | 5.54% | 4.01% | 4.01% |

TABLE 4-continued

| Material (supplier) | C9 | EX6 | C10 | EX7 | EX8 | EX9 | EX10 |
|---|---|---|---|---|---|---|---|
| Reinforcing silica (Evonik) | 2.74% | 2.57% | 2.57% | 2.66% | 2.63% | 0.79% | 0.79% |
| Non-reinforcing silica (Evonik) | 4.56% | 4.28% | 4.29% | 4.43% | 4.39% | 3.97% | 3.97% |
| methyl-trimethoxysilane | 0.83% | 0.94% | 0.94% | 0.95% | 0.94% | 0.68% | 0.68% |
| $TiO_2$ | 2.28% | 2.14% | 2.14% | 2.21% | 2.20% | 1.99% | 1.99% |
| stearic acid treated $CaCO_3$ | | | | | | 9.53% | 9.53% |
| EG 250 $cm^3$/g, 350 μm (Graphtek) | 4.05% | | 4.39% | | | | |
| EG 250 $cm^3$/g-250 μm (Graphtek) | | | | 8.25% | | | |
| EG 85 $cm^3$/g-95% <250 μm (LKAB) | | 8.46% | | | 6.41% | 7.94% | 5.56% |
| EG 250 + $cm^3$/g-<300 μm (LKAB) | | | | | 1.76% | | 2.38% |
| Enfil fiber (Morgan Ceramics) | 7.09% | | 7.67% | | | 9.53% | 9.53% |
| Roxul 605 (Lapinus) | | 7.39% | | 7.18% | 7.99% | | |
| micronized, coated APP (Clariant) | 20.23% | | 21.91% | 16.51% | 16.36% | | |
| fine powdered APP (Clariant) | | | | | | 15.88% | 15.88% |
| Coated micronized powdered APP (Clariant) | | 14.29% | | | | | |
| Melamine | | 3.91% | | | | | |
| Adhesion promoter (Dow Silicones Corp.) | 2.37% | 2.69% | 2.69% | 2.73% | 2.71% | 1.96% | 1.96% |
| DMTDN | 0.05% | 0.07% | 0.07% | 0.06% | 0.06% | 0.05% | 0.05% |
| Sum | 100.00% | 100.00% | 100.00% | 100.00% | 100.00% | 100.00% | 100.00% |
| % intumescent ingredient in the composition | 24.28% | 26.67% | 26.30% | 24.76% | 24.53% | 23.82% | 23.82% |
| % graphite in the intumescent ingredient | 16.69% | 31.73% | 16.68% | 33.33% | 33.29% | 33.33% | 33.33% |

The cured materials resulting from the mixtures indicated in table 4 were assessed for snap time and durability of the coating. The corresponding chars were tested for coating expansion and solid char. The results are summarized in Table 5.

TABLE 5

| Material | C9 | EX6 | C10 | EX7 | EX8 | EX19 | EX10 |
|---|---|---|---|---|---|---|---|
| Snap time (min) | 9 | 10-15 | 10-15 | 11 | 10 | 11 | 12 |
| Adhesion - 1 wk RT on steel | 100% CF | 100% CF | 100% CF | 100% CF | 100% CF | 100% CF | 100% CF |
| Adhesion- after 1 wk in water @ 23° C. | 100% CF | 100% CF | 100% CF | 100% CF | 100% CF | 100% CF | 100% CF |
| Adhesion - after 1 wk in water @ 55° C. | | | | 50% CF | 100% CF | | |
| Adhesion - after 1 wk in water @ 45° C. | 90% AF | 50% CF | 90% AF | | | 100% CF | 100% CF |
| Coating Durability | FAILS | PASS | FAILS | PASS | PASS | PASS | PASS |
| Char Height (cm); (EXP, %) | 4 (300%) | ±3 (±200%) | Not tested | 5.5 (450%) | 5 (400%) | 4 (300%) | 4-5 (300-400%) |
| Expansion % | PASS | PASS | NA | PASS | PASS | PASS | PASS |
| Char Consistency score | Not tested | 2 | Not tested | 2-3 | 2-3 | 2 | 2 |
| Char Consistency Result | NA | PASS | NA | PASS | PASS | PASS | PASS |
| Char Adhesion | NA | Acceptable | NA | Acceptable | Good | Acceptable | Good |
| Char Adhesion Result | NA | PASS | NA | PASS | PASS | PASS | PASS |

Intumescent coating material (i.e. the cured product of the mixtures of table 4) of only the examples of the disclosure (Ex 6 to Ex 10) achieved a durable coating, i.e. withstood the entire sequence of 3 adhesion tests described above.

Only the examples of the disclosure (Ex 6 to Ex 10) have a char thickness of at least 2 cm (e.g. at least 200% expansion), an index of char consistency of at least 2, and at least acceptable char adhesion.

Based on data in tables 2, 3, 4 and 5, the following mixtures (table 6) were made as described above and coated on non-primed steel plates at thickness of 10 mm. The amounts of each ingredient are given in weight percent (table 6). The physical properties thereof are provided in Table 7.

The material was left to cure for at least two weeks and then tested under the conditions of UL1709 (Rapid Rise Fire Tests of Protection Materials for Structural Steel) using the equipment (furnace) described by Gardelle et al. in Eur. Polymer J, 2013, volume 49, page 2031-2041. During the burning the plate are held vertically. The time needed to reach 500° C. as well as the properties of the char have been recorded. The data for time to 500° C. are the average of three independent measurements. For C11 sample (comparative example, no APP) we have observed a detachment of (part of) the char during the burning, witnessed by a sudden and rapid increase of temperature. When several equivalent specimens are tested (replication) the number of failing specimens should be below 20% of the total number of tested specimens.

TABLE 6

| Composition (Supplier) | Ex11 | C11 |
|---|---|---|
| Composition (Supplier) | Ex11 | C11 |
| dimethylhydroxy end-capped polydimethyl-siloxane silanol end-capped silicone DP of 580 +/− 10% (Dow Silicones Corp.) | 33.99% | — |
| dimethylhydroxy end-capped polydimethyl-siloxane silanol end-capped silicone DP of 300 +/− 10% (Dow Silicones Corp.) | 13.43% | 44.27% |
| TrimethoxyEthyl-tri-methoxy- endcapped polydimethylsiloxaneSilicone DP of 850 +/− 10% (Dow Silicones Corp.) | — | 4.33% |

TABLE 6-continued

| Composition (Supplier) | Ex11 | C11 |
|---|---|---|
| Trimethyl-siloxy end-capped polydimethyl-siloxanesilicone viscosity 12500 mPa · s at 25° C. | — | 6.32% |
| methyl-trimethoxy silane | 0.83% | 0.20% |
| APP micronized, coated (Clariant) | 20.00% | — |
| EG 250 cm$^3$/g <250 μm (Graphtek) | 8.00% | — |
| EG 350 cm$^3$/g, <300 μm (Graphitwerk Kropfmuehl) | — | 9.32% |
| EG 100 cm$^3$/g, <150 μm (Graphitwerk Kropfmuehl) | — | 3.11% |
| stearic acid treated CaCO$_3$ (Solvay) | — | 23.30% |
| reinforcing silica (EVONIK) | 2.55% | 0.22% |
| non-reinforcing silica (EVONIK) | 4.25% | — |
| TiO$_2$ (DuPont) | 2.49% | — |
| Enfil SH fiber (Morgan Ceramics) | 7.00% | 5.84% |
| Adhesion promoter A (Dow Silicones Corp.) | — | 3.08% |
| 993 HV/GER curing agent (Dow Silicones Corp.) | 7.43% | — |
| DMDTN | 0.04% | 0.02% |
| SUM | 100.00% | 100.00% |
| % intumescent ingredient in the composition | 28.00% | 12.43% |
| % graphite in the intumescent ingredient | 28.6% | 100.0% |

TABLE 7

| Coating properties | Ex11 | C11 |
|---|---|---|
| Time to 500° C. -seconds (average of 3) | 2042 | 2661 |
| Char height (cm) (average of 3) and Exp in % | 8 (700%) | 8 (700%) |
| Final rating of coating expansion | PASS | PASS |
| Char consistency (three measurements) | 3, 3, 3 | 2, 2, 1 |
| final rating on char consistency | PASS3 | FAIL |
| Char Adhesion (three measurements) | good | acceptable, |
| Final rating on criterion adhesion | good | acceptable, |
|  | good | poor- |
|  | PASS | FAIL |
| Coating durability | PASS | PASS |

Intumescent coating material (i.e. the cured product of the mixtures of table 6) of the example of the disclosure (Ex 11) and the comparative example (C11) achieved a durable coating, i.e. withstood the entire sequence of 3 adhesion tests described above.

Only the example of the disclosure (Ex 11) has a char thickness of at least 2 cm (e.g. at least 200% expansion), an index of char consistency of at least 2 (over three measurements), and at least acceptable char adhesion (over three measurements).

Table 8 below indicates further examples of the disclosure (Ex12 to and C12).

TABLE 8

| Ingredient | C12 | Ex12 |
|---|---|---|
| Curable polydimethylsiloxane composition | 55.44 | 57.92 |
| Basalt fibres | 4.46 | 3 |
| Enfil/lapinus fibres | 2.97 | 1.5 |
| Titanium dioxide | 1.98 | 1 |
| APP |  | 9 |
| Melamine | 3.47 | 3 |
| Expandable graphite | 10.89 | 6 |
| Zinc Borate | 10.89 | 2.86 |
| Mica | 9.9 | 5.72 |
| Glass Frit |  | 10 |
| SUM | 100 | 100 |
| % intumescent ingredient in the composition | 14.36 | 9.00 |
| % graphite in the intumescent ingredient | 75.84 | 33.33 |

In table 8 above 'Curable polydimethylsiloxane composition' comprises the siloxane polymer, cross-linker and any polydialkylsiloxane present.

Basalt fibres were 3 mm-12 mm in length, diameter 10 μm-13 μm.

TABLE 9

| Coating properties | C12 | Ex12 |
|---|---|---|
| Time to 500° C. -seconds (average of 3) | 4110 | 5370 |
| Char Expansion in % | 300% | 650% |
| Final rating of coating expansion | PASS | PASS |
| Char consistency (three measurements) | 2, 2, 3 | 3, 3, 3 |
| final rating on char consistency | PASS | PASS |
| Char Adhesion (three measurements) | poor | acceptable |
| Final rating on criterion adhesion | poor | acceptable |
|  | poor | acceptable |
|  | FAIL | PASS |
| Coating durability | PASS | PASS |

Acceptable levels of durability are obtained when the curable mixture comprises about 5 to about 20% by weight of the phosphorus containing compound or composition comprising a phosphorus containing compound, for example APP.

There is thus described a mixture curable to provide an intumescent coating material, an intumescent coating material, a method of providing an intumescent coating material, an intumescent coating, a method of protecting a substrate with an intumescent coating, and a protected substrate with a number of advantages as detailed above.

Furthermore, intumescent coating materials and intumescent coatings according to examples of the disclosure are extremely durable. Upon exposure to fire and/or temperature at or above 500° C., the material expands at least 200%, and forms a solid char to protect the underlying substrate.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A mixture curable in the presence of a suitable metallic catalyst to provide an intumescent coating material, wherein the mixture comprises:
   a siloxane polymer;
   a cross-linker for cross-linking the siloxane polymer;
   filler, wherein the filler comprises char reinforcing filler; and
   an intumescent ingredient, wherein the intumescent ingredient comprises expandable graphite and a phosphorus containing compound or a composition comprising a phosphorus containing compound, wherein the mixture comprises 5 to 20% by weight of the phosphorus containing compound or composition comprising a phosphorus containing compound;
   wherein the expandable graphite is present in an amount between 10 to 40% by weight of the intumescent ingredient, and wherein the expandable graphite is a blend of two or more grades.

2. A mixture according to claim 1, wherein the intumescent ingredient comprises 10 to 35% by weight expandable graphite.

3. A mixture according to claim 1, wherein the phosphorus containing compound or composition comprising a phosphorus containing compound comprises ammonium polyphosphate.

4. A mixture according to claim 1, wherein the mixture comprises 6 to 25% by weight of the char reinforcing filler.

5. A mixture according to claim 1, wherein the mixture comprises 7 to 20% by weight of the char reinforcing filler.

6. A mixture according to claim 1, wherein the expandable graphite has an onset of expansion temperature of 160 to 180° C.

7. A mixture according to claim 1, wherein a first of the grades has a relatively low thermal expansion, and a second of the grades has a relatively high thermal expansion.

8. A mixture according to claim 1, wherein the mixture comprises polydialkylsiloxane which is unreactive with the siloxane polymer.

9. A mixture according to claim 1, wherein the siloxane polymer comprises polydiorganopolysiloxane.

10. A mixture according to claim 9, wherein the polydiorganopolysiloxane comprises at least two condensable or hydrolyzable groups.

11. A mixture according to claim 10, wherein the at least two condensable or hydrolyzable groups comprise hydroxyl groups or alkoxy groups.

12. A mixture according to claim 1, wherein the suitable metallic catalyst comprises a metallic condensation catalyst.

13. A mixture according to claim 12, wherein the metallic condensation catalyst comprises a tin based condensation catalyst.

14. A mixture according to claim 1, wherein the filler comprises reinforcing and/or non-reinforcing filler.

15. A mixture according to claim 1, wherein the mixture comprises an adhesion promotor.

16. A mixture according to claim 1, wherein the mixture comprises a compatibilizer.

17. A method, the method comprising mixing:
   a siloxane polymer;
   a cross-linker for cross-linking the siloxane polymer;
   filler, wherein the filler comprises char reinforcing filler; and
   an intumescent ingredient, wherein the intumescent ingredient comprises expandable graphite and a phosphorus containing compound or a composition comprising a phosphorus containing compound, wherein the mixture comprises 5 to 20% by weight of the phosphorus containing compound or composition comprising a phosphorus containing compound; wherein the expandable graphite is present in an amount between 10 to 40% by weight of the intumescent ingredient, and wherein the expandable graphite is a blend of two or more grades;
   the method further comprising allowing the mixture to cure in the presence of a suitable metallic catalyst to provide an intumescent coating material.

18. An intumescent coating material, wherein the intumescent coating material is the cured reaction product of a mixture comprising:
   a siloxane polymer;
   a cross-linker for cross-linking the siloxane polymer;
   filler, wherein the filler comprises char reinforcing filler; and
   an intumescent ingredient, wherein the intumescent ingredient comprises expandable graphite and a phosphorus containing compound or a composition comprising a phosphorus containing compound, wherein the mixture comprises 5 to 20% by weight of the phosphorus containing compound or composition comprising a phosphorus containing compound;
   wherein the expandable graphite is present in an amount between 10 to 40% by weight of the intumescent ingredient, and wherein the expandable graphite is a blend of two or more grades.

19. A mixture according to claim 3, wherein the mixture comprises 10 to 20% by weight of the ammonium polyphosphate.

* * * * *